United States Patent
Bäurle et al.

(10) Patent No.: US 7,760,518 B2
(45) Date of Patent: *Jul. 20, 2010

(54) METHOD AND APPARATUS FOR FAULT DETECTION IN A SWITCHING POWER SUPPLY

(75) Inventors: Stefan Bäurle, San Jose, CA (US); William M. Polivka, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/424,302

(22) Filed: Apr. 15, 2009

(65) Prior Publication Data

US 2009/0231888 A1    Sep. 17, 2009

Related U.S. Application Data

(63) Continuation of application No. 11/174,183, filed on Jul. 1, 2005, now Pat. No. 7,539,028.

(51) Int. Cl.
*H02M 3/335* (2006.01)

(52) U.S. Cl. ............ 363/19; 363/21.17; 363/56.1; 363/56.03; 363/95; 363/97; 363/131; 323/282; 323/284

(58) Field of Classification Search .......... 363/19
See application file for complete search history.

(56) References Cited

U.S. PATENT DOCUMENTS 5,297,014 A    3/1994    Saito et al.

(Continued)

FOREIGN PATENT DOCUMENTS

EP    1 241 778 A    9/2002

(Continued)

OTHER PUBLICATIONS

"TNY263-268: TinySwitch®-II Family—Enhanced, Energy Efficient, Low Power Off-line Switcher," Power Integrations, Inc., Revision F, Dec. 2004, pp. 1-24.

(Continued)

*Primary Examiner*—Edward Tso
*Assistant Examiner*—Arun Williams
(74) *Attorney, Agent, or Firm*—Blakely Sokoloff Taylor & Zafman, LLP

(57) ABSTRACT

Techniques are disclosed to detect a fault in the feedback circuit of a switching power supply while the power supply operates in a mode where the output is below its regulated value. The power supply delivers maximum power at a given switching frequency without a feedback signal while the output is below its regulated value. A fault protection circuit substantially reduces the average output power if there is no feedback signal for the duration of a fault time. When there is no feedback signal, the power supply increases the maximum output power by increasing the switching frequency before the end of the fault time to increase the output to a regulated value. The presence of a feedback signal when the output reaches a regulated value restores the original switching frequency and returns the output to its unregulated value. The absence of a feedback signal at the end of the fault time engages the fault protection circuit to substantially reduce the output power.

9 Claims, 9 Drawing Sheets

U.S. PATENT DOCUMENTS

| | | |
|---|---|---|
| 5,377,091 A | 12/1994 | Faulk |
| 5,491,794 A * | 2/1996 | Wu .............................. 714/23 |
| 5,675,232 A | 10/1997 | Koenck |
| 5,675,240 A | 10/1997 | Fujisawa et al. |
| 5,796,596 A * | 8/1998 | Williams ................. 363/21.16 |
| 5,999,421 A | 12/1999 | Liu |
| 6,252,783 B1 | 6/2001 | Huh et al. |
| 6,480,043 B2 * | 11/2002 | Hall et al. ................... 327/108 |
| 6,519,165 B2 | 2/2003 | Koike |
| 6,842,350 B2 | 1/2005 | Yamada et al. |
| 2004/0095694 A1 | 5/2004 | Balakrishnan et al. |
| 2005/0128773 A1 | 6/2005 | Yang et al. |
| 2006/0017426 A1 | 1/2006 | Yang et al. |
| 2006/0044845 A1 | 3/2006 | Fahlenkamp et al. |

FOREIGN PATENT DOCUMENTS

| | | |
|---|---|---|
| EP | 1 737 112 A | 12/2006 |
| WO | WO 00/72435 A1 | 11/2000 |

OTHER PUBLICATIONS

EP 06 25 3216—European Search Report mailed Mar. 3, 2008.

* cited by examiner

METHOD AND APPARATUS FOR FAULT DETECTION IN A SWITCHING POWER SUPPLY

REFERENCE TO RELATED APPLICATION

The present application is a continuation of U.S. patent application Ser. No. 11/174,183, filed Jul. 1, 2005, now pending, entitled "METHOD AND APPARATUS FOR FAULT DETECTION IN A SWITCHING POWER SUPPLY," which is hereby incorporated by reference.

BACKGROUND

1. Technical Field

The present invention relates generally to electronic circuits, and more specifically, the invention relates to switched mode power supplies.

2. Background Information

A common application of switching power supplies is to charge batteries. The output power of a battery charger is usually controlled to provide a regulated voltage and a regulated current. The voltage is regulated between a maximum and a minimum voltage over a range of output current. The current is regulated between a maximum and a minimum current over a range of output voltage. Regulation is achieved by means of a feedback signal that reduces the output of the power supply whenever the output voltage or the output current exceeds a regulated value. The power supply typically has a fault protection feature that prevents excessive output voltage or excessive output current when there is no feedback signal. Without the fault protection feature, a failure that results in the loss of the feedback signal would cause the output voltage or output current to go high enough to damage the battery or the power supply. Therefore, the absence of a feedback signal typically causes the power supply to operate in an auto-restart cycle that substantially reduces the average output voltage and average output current until the feedback signal is restored.

Typical battery chargers usually exhibit an abrupt transition from regulated output current to regulated output voltage. That is, the locus of output voltage and output current plotted in Cartesian coordinates usually has a sharp corner at the point of transition that corresponds to the point of maximum output power.

The practice of designing a battery charger to have a sharp transition between regulated voltage and regulated current can result in a product that costs more than necessary to provide the desired function. It is often possible to reduce the cost of the battery charger and to meet all requirements by designing an unregulated transition between the regulated voltage and the regulated current. The output voltage and output current in the region of unregulated transition is bounded by the natural output characteristics of the switching regulator, and typically follows the curve of maximum output power for a given output voltage and output current.

To achieve lower cost, the switching regulator is designed to operate with a control circuit that permits the regulator to make an unregulated transition between regulated output voltage and regulated output current such that the voltage and current are maintained within their specified boundaries. Proper design of the unregulated transition within the specified boundaries of output voltage and output current reduces the maximum power output, allowing the use of components that are less costly than the components to guarantee higher output power. The control circuit operates the switching regulator for regulated voltage, regulated current, or unregulated transition, depending on the current demanded by the load.

The fault protection feature that responds to the absence of the feedback signal presents an obstacle to sustained operation in the unregulated transition region. The feedback signal is substantially zero when the power supply operates in the unregulated transition region because the output voltage and output current are substantially below their regulated values. By design, the power supply operates to produce maximum output power in the unregulated transition region. The fault protection feature typically permits the power supply to produce maximum output power without a feedback signal for only the short time required to bring the output voltage or output current from zero to the regulated value under normal load conditions after start-up. If a feedback signal is not present after the normal start-up time, the power supply enters the auto-restart cycle.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
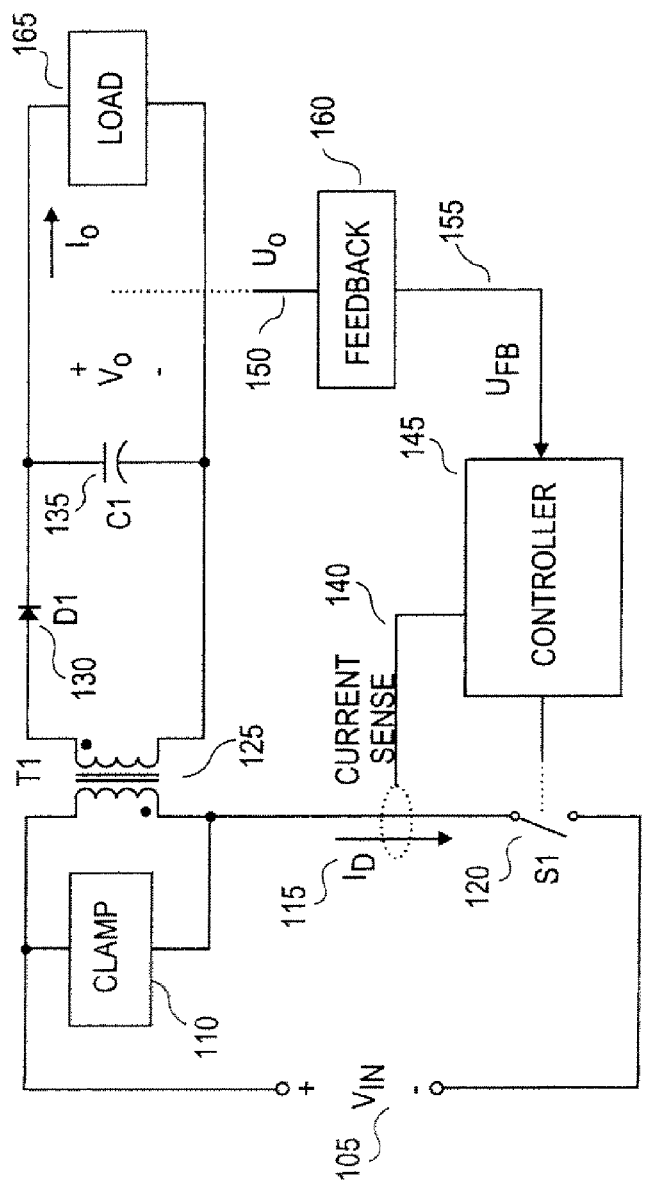
FIG. 1 is a functional block diagram of one embodiment of a switching power supply that may operate in an unregulated transition region with fault protection in accordance with the teaching of the present invention.
Figure 1:
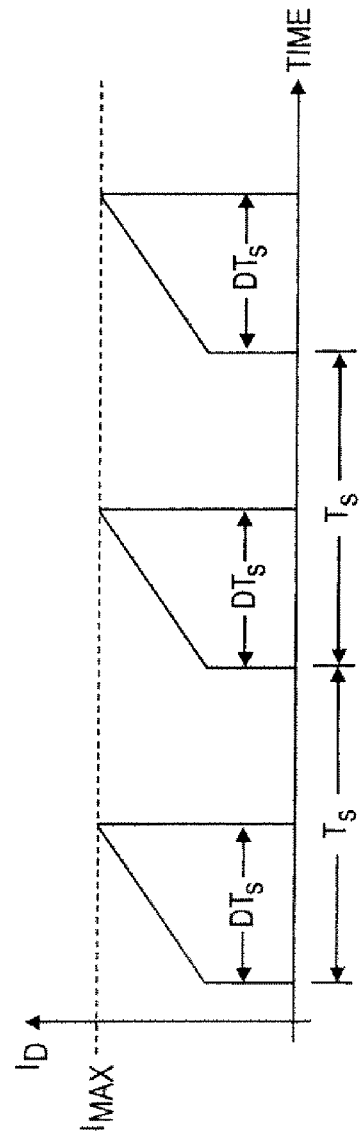

Techniques are disclosed to provide an unregulated mode of operation with fault protection from loss of feedback for a power supply that allows it to meet the requirements of a battery charger at a lower cost than conventional solutions. Embodiments of the present invention are directed to methods and/or apparatuses that allow a power supply to operate in an unregulated transition region with a fault protection circuit that responds to the absence of a feedback signal. To illustrate, FIG. 1 shows a functional block diagram of one embodiment of a power supply that may include an embodiment of a power supply regulator that is a battery charger in accordance with the teachings of the present invention. The topology of the power supply illustrated in FIG. 1 is known as a flyback regulator. It is appreciated that there are many topologies and configurations of switching regulators, and that the flyback topology shown in FIG. 1 is provided to illustrate the principles of an embodiment of the present invention that may apply also to other types of topologies in accordance with the teachings of the present invention.

The power supply in FIG. 1 provides output power to a load 165 from an unregulated input voltage $V_{IN}$ 105. In one embodiment, the load 165 may be a rechargeable battery. The input voltage $V_{IN}$ 105 is coupled to an energy transfer element T1 125 and a switch S1 120. In the example of FIG. 1, the energy transfer element T1 125 is coupled between an input of the power supply and an output of the power supply. In the example of FIG. 1, the energy transfer element T1 125 is illustrated as a transformer with two windings. In general, the transformer can have more than two windings, with additional windings to provide power to additional loads, to provide bias voltages, or to sense the voltage at a load. A clamp circuit 110 is coupled to the primary winding of the energy transfer element T1 125 to control the maximum voltage on the switch S1 120. Switch S1 120 is switched on and off in response to one embodiment of a controller circuit 145 in accordance with the teachings of the present invention. In one embodiment, switch S1 120 is a transistor such as for example a power metal oxide semiconductor field effect transistor (MOSFET). In one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or a substantially constant output current $I_O$ at the load 165.

The output quantity to be regulated is $U_O$ 150, that in general could be an output voltage V0, an output current $I_O$, or a combination of the two. The regulated quantity is not necessarily fixed, but can be regulated to change in a desired way in response to a feedback signal. As will be explained later, the output quantity $U_O$ 150 can change in a desired way even when it is unregulated. An output that does not respond to a feedback signal is unregulated. A feedback circuit 160 is coupled to the output quantity $U_O$ 150 to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115.

Owing to the limitations of one or more components in the circuit, the switches in all power supply designs have a maximum current limit $I_{MAX}$ that they cannot exceed. Although all switches are inherently current limited, controllers in switching power supplies usually prevent the switches from exceeding the maximum current limit for the design.

FIG. 1 also illustrates an example waveform for current $I_D$ 115 to show the parameters that the controller can adjust to regulate the output quantity $U_O$ 150. The maximum of current $I_D$ 115 is $I_{MAX}$, the switching period is $T_s$, and the duty ratio is D. The controller typically limits the duty ratio to a maximum $D_{MAX}$ that is less than 100%.

In one embodiment, the controller 145 operates switch S1 120 to substantially regulate the output $U_O$ 150 to its desired value. In one embodiment, the output $U_O$ changes from an output voltage to an output current in response to the magnitude of the output voltage or the output current. In one embodiment, controller 145 includes an oscillator that defines a substantially regular switching period $T_s$. In one embodiment, regulation is accomplished by control of the conduction time of the switch within a switching period. In each switching period, the fraction of the switching period that the switch is closed is the duty ratio D of the switch. In one embodiment, regulation is accomplished by control of the maximum current $I_{MAX}$ of the switch. In another embodiment, regulation is accomplished by control of the switching period $T_s$.

In one embodiment, the controller 145 operates switch S1 120 at its maximum current or at its maximum duty ratio to produce an output $U_O$ 150 that is not regulated when the feedback signal $U_{FB}$ is either absent or too low to influence the regulation of the output. A feedback signal $U_{FB}$ that is too low to influence the regulation of the output is equivalent to the absence of a feedback signal. The value of the unregulated output $U_O$ is determined by the maximum power capability of the circuit for a particular set of operating conditions. The instantaneous output power $P_O$ is the output voltage $V_O$ multiplied by the output current $I_O$.

In one embodiment, controller 145 includes a protection feature that operates the power supply at a reduced average output voltage and a reduced average output current to avoid damage from a fault that prevents the feedback signal from reaching the controller. In one embodiment, the protection feature is an auto-restart cycle. In one embodiment in the auto-restart cycle, the controller 145 allows the power switch S1 120 to operate unregulated for a duration that is long enough to cause the output $U_O$ to produce a feedback signal $U_{FB}$ 155, followed by a long interval of no switching if the output does not produce a feedback signal $U_{FB}$ 155 during the allowed duration of the switching. The auto-restart cycle repeats until the feedback signal $U_{FB}$ 155 meets the proper criteria for regulation.

When not responsive to feedback signal $U_{FB}$ 155, parameters $I_{MAX}$, D, and $T_s$ can be either fixed or allowed to vary in response to changes in other quantities such as for example the input voltage $V_{IN}$ 105 or the load 165. In one embodiment, such changes are determined by the natural characteristics of the topology of the power converter, such as the flyback topology. For example, for fixed quantities $V_{IN}$ 105, $I_{MAX}$, and $T_s$, the duty ratio D is a known function of the output voltage $V_O$. Thus, one embodiment of a regulator can be designed so that an output behaves in a desired way when it is not regulated by a feedback signal in accordance with the teachings of the present invention. As will be discussed, one embodiment of the oscillator included in controller 145 is configured to switch temporarily at a higher frequency to increase the maximum output power capability of the circuit.

Figure 2:
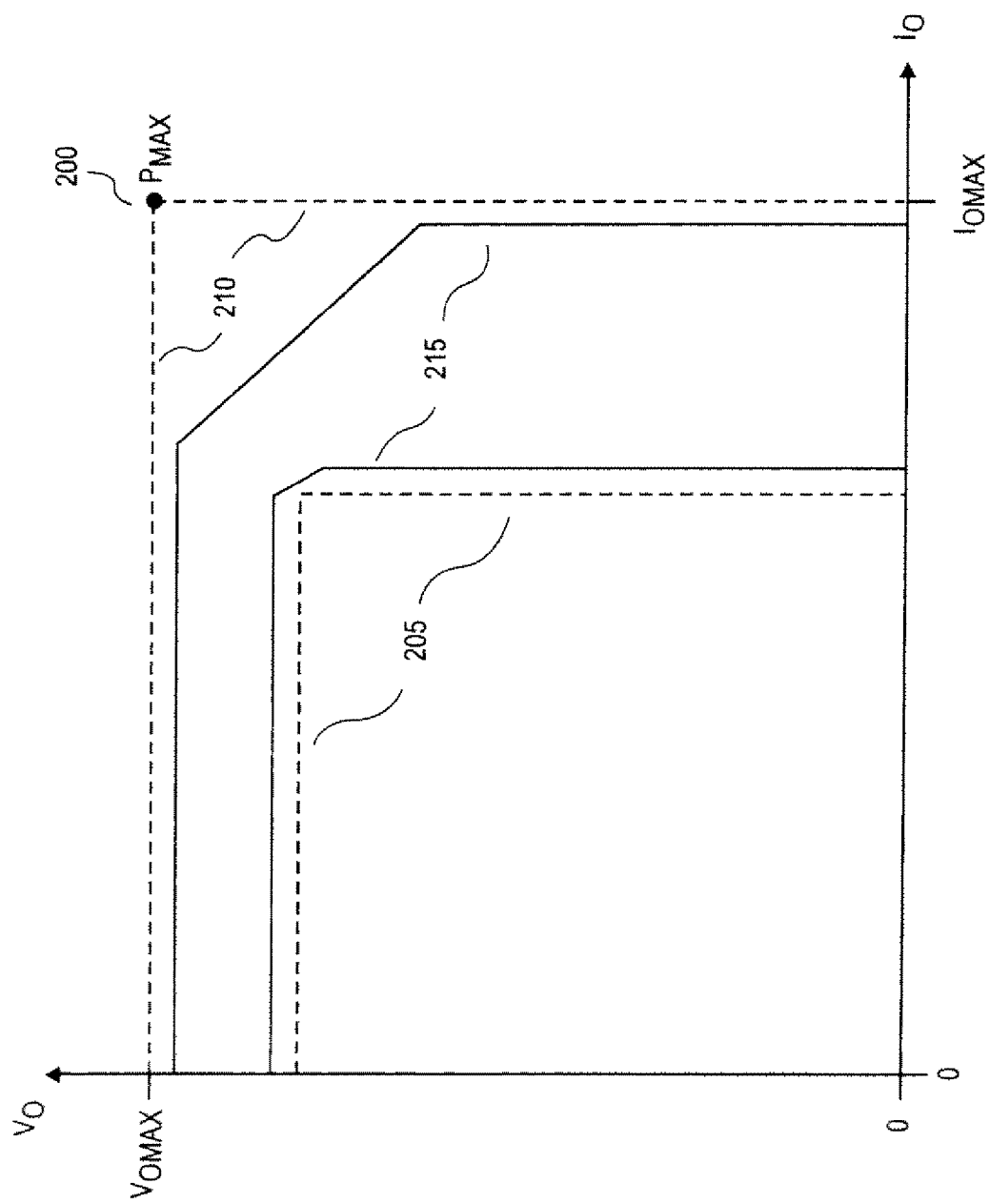
FIG. 2 is a diagram that shows the boundaries of output voltage and output current of one embodiment of a switching power supply that may operate in an unregulated transition region with fault protection in accordance with the teachings of the present invention.

FIG. 2 shows boundaries for output voltage and output current according to one embodiment of a switching power supply that operates in accordance with the teachings of the present invention. The output of the power supply is confined within the region of the solid lines 215 that are between the inner boundary 205 and the outer boundary 210. The outer boundary 210 sets a maximum output voltage $V_{OMAX}$ and a maximum output current $I_{OMAX}$ that define a maximum output power $P_{MAX}$ at the intersection 200 of the lines for $V_{OMAX}$ and $I_{OMAX}$. A power supply that has output characteristics within the region of the solid lines 215 will operate between the outer boundary 210 and the inner boundary 205 at less than the maximum output power $P_{MAX}$. Such a power supply will typically cost less than one capable of operation at $P_{MAX}$.

Figure 3:
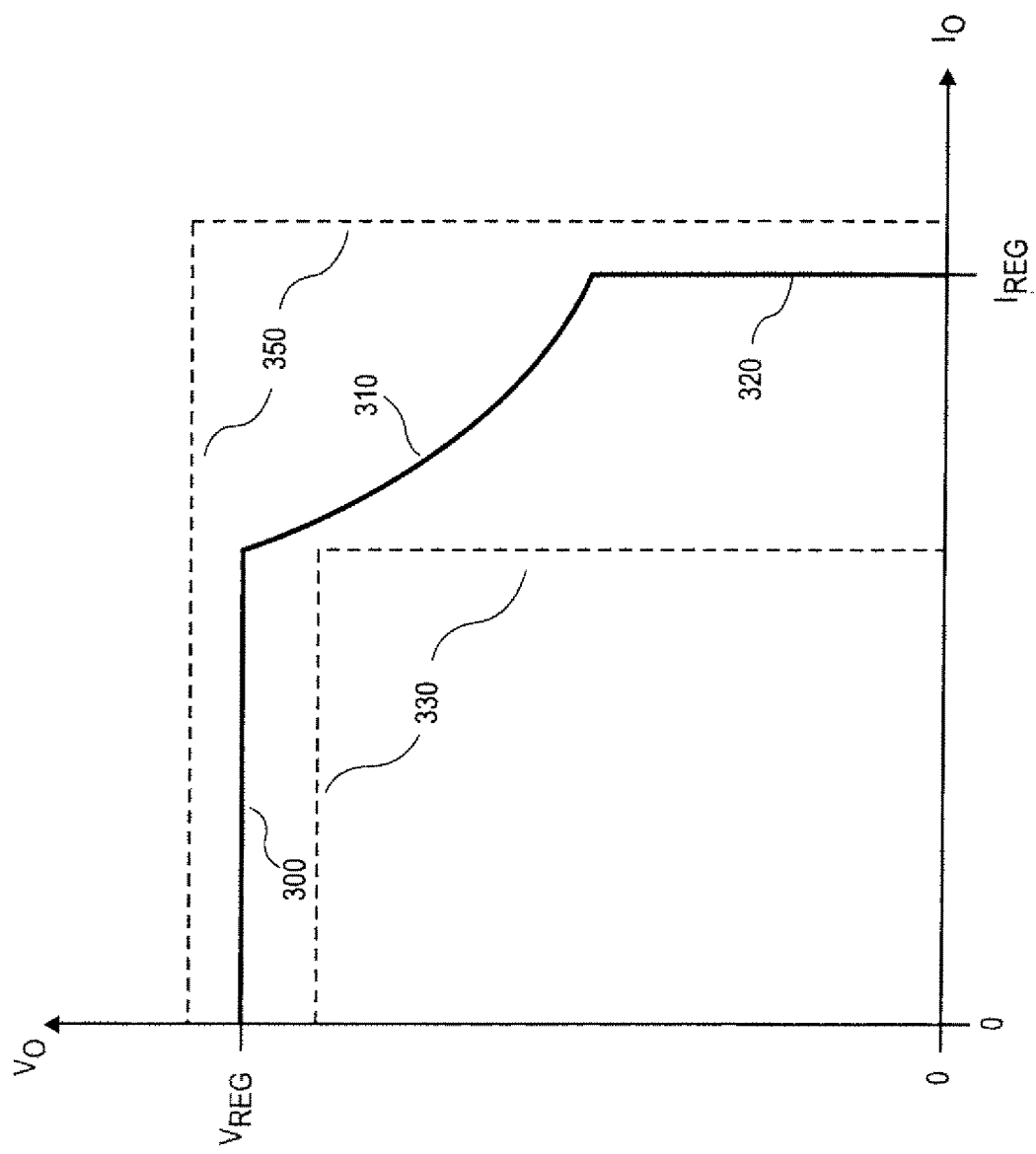
FIG. 3 shows the relationship between output voltage and output current from a power supply that includes an unregulated transition between a regulated voltage and a regulated current in accordance with the teachings of the present invention.

FIG. 3 shows the characteristics of the output voltage and output current of one embodiment of a switching power supply that operates in accordance with the teaching of the present invention. The output voltage and output current follow a curve that includes three distinct line segments. Each line segment corresponds to a different region of operation. Output voltage is regulated along line segment 300 in a regulated voltage region. Output current is regulated along line segment 320 in a regulated current region. The output voltage and output current are unregulated along line segment 310 in an unregulated transition region, with line segment 310 describing the maximum output power at a given input voltage and a given switching frequency for the power supply without feedback. As shown, the output voltage and output current fall within the specified boundaries 330 and 350.

In one embodiment, a switching power supply has a protection feature to prevent a sustained delivery of maximum output power in the absence of a feedback signal. In one embodiment, absence of a feedback signal for a time greater than a fault detection period $T_{FAULT}$ causes the power supply to enter an auto-restart mode that substantially reduces the average output power. Therefore, the protection feature does not allow the power supply to operate on the line segment 310 of unregulated maximum power for a duration greater than the time $T_{FAULT}$.

Embodiments of the present invention overcome the limitations imposed by the auto-restart protection feature by increasing the maximum output power of the power supply for a short time if feedback is absent for a time slightly less than $T_{FAULT}$. The increase in maximum output power raises either the output voltage or the output current from its value along line segment 310 to the regulated value of $V_{REG}$ or $I_{REG}$ respectively. If there is no fault in the feedback circuitry, a feedback signal will cause the controller to bypass entry into the auto-restart mode and to reset the maximum output power to its original value along line segment 310.

Figure 4A:
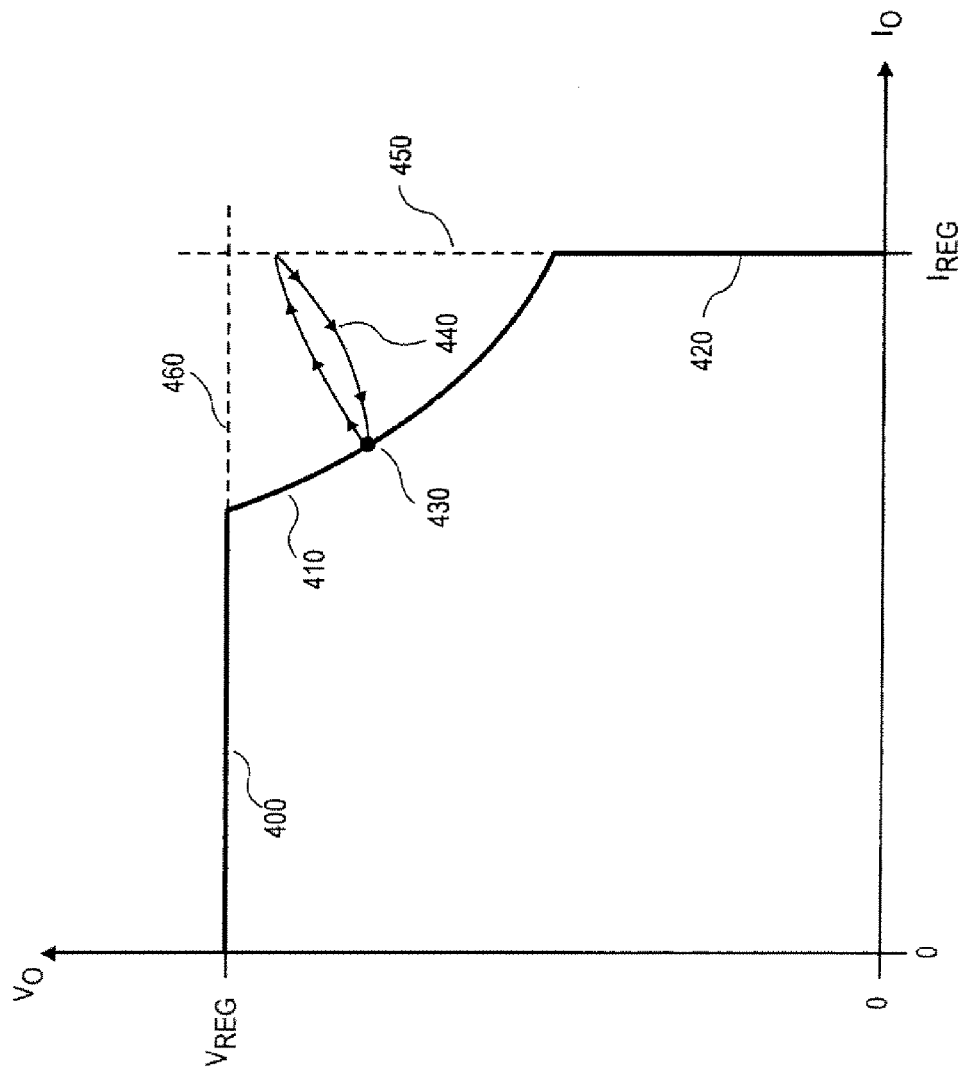
FIGS. 4A and 4B show excursions of an operating point of a power supply from an unregulated condition with no feedback signal to a regulated condition that forces a feedback signal in response to a temporary increase in output power in accordance with the teachings of the present invention.
Figure 4B:
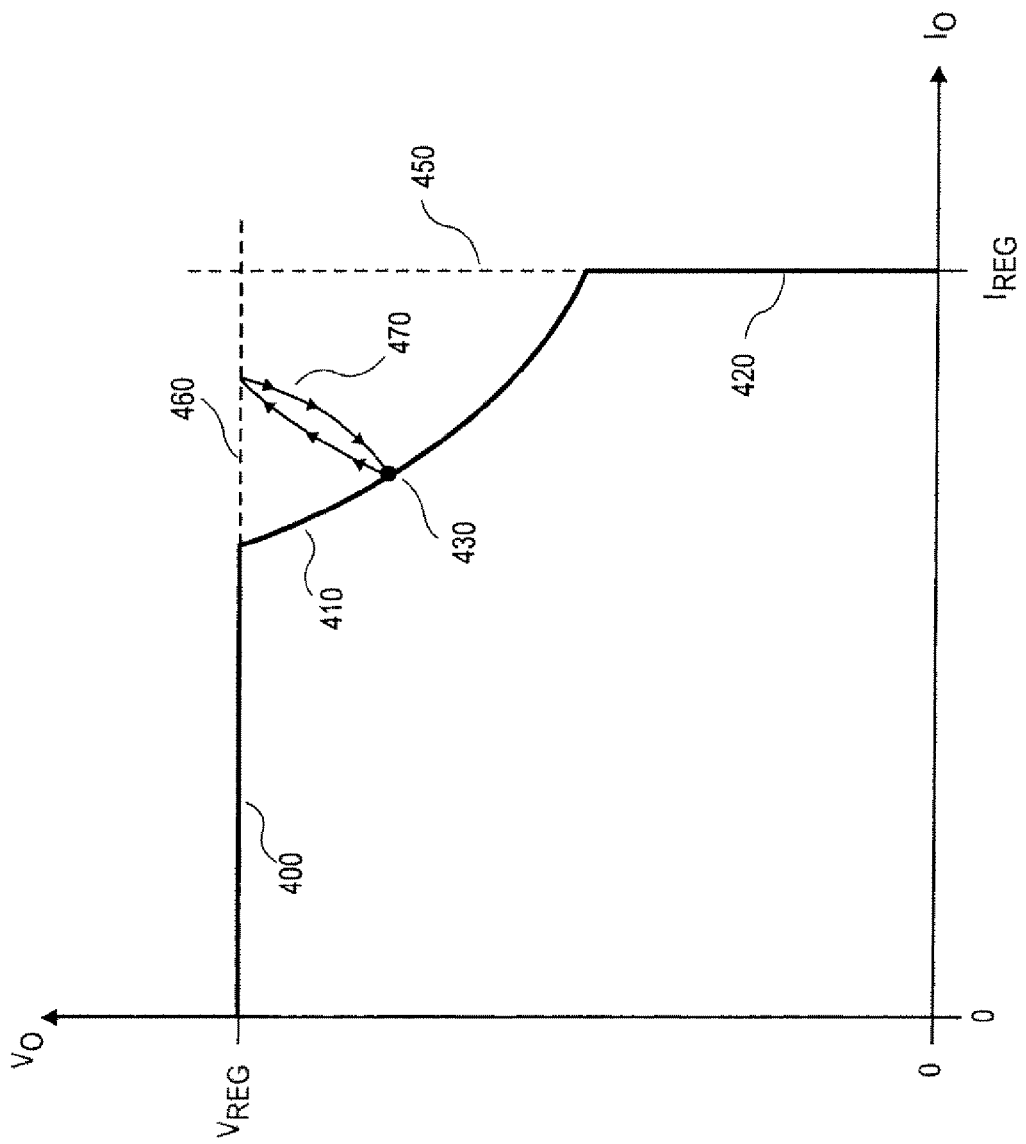

FIGS. 4A and 4B illustrates the movements of an operating point from an unregulated condition with no feedback signal to a regulated condition that forces a feedback signal in response to a temporary increase in output power. The figures show the locus of output voltage and output current for an embodiment of a switching power supply in accordance with the teachings of the present invention. Output voltage is regulated along line segment 400. Output current is regulated along line segment 420. The output voltage and output current are unregulated along line segment 410. In one embodiment, the increase in output power moves the operating point 430 from its position on the line segment of unregulated operation 410 to a regulated current 450, as illustrated with movement 440 in FIG. 4A. In one embodiment, the increase in output power moves the operating point 430 from its position on the line segment of unregulated operation 410 to a regulated voltage 460, as illustrated with movement 470 in FIG. 4B. The particular characteristics of the power supply circuit and the load determine the actual path of the operating point as it moves from the line segment of unregulated operation 410 to either a regulated voltage 460 or a regulated current 450 in response to an increase in maximum output power.

The maximum output power of a switching power supply is set by the maximum switch current $I_{MAX}$ and the switching frequency $f_s$ that is the reciprocal of the switching period $T_s$. Whereas limitations in component capabilities usually prohibit an increase in $I_{MAX}$, it is usually possible to increase the switching frequency substantially beyond its optimum value. The optimum value of switching frequency is typically chosen to obtain the highest efficiency within the bounds of other design constraints. The reduction in efficiency from operation at a higher switching frequency for a short time is usually negligible. Therefore, a temporary increase of the switching frequency can increase the maximum output power of a switching power supply without significant penalty.

Figure 5:
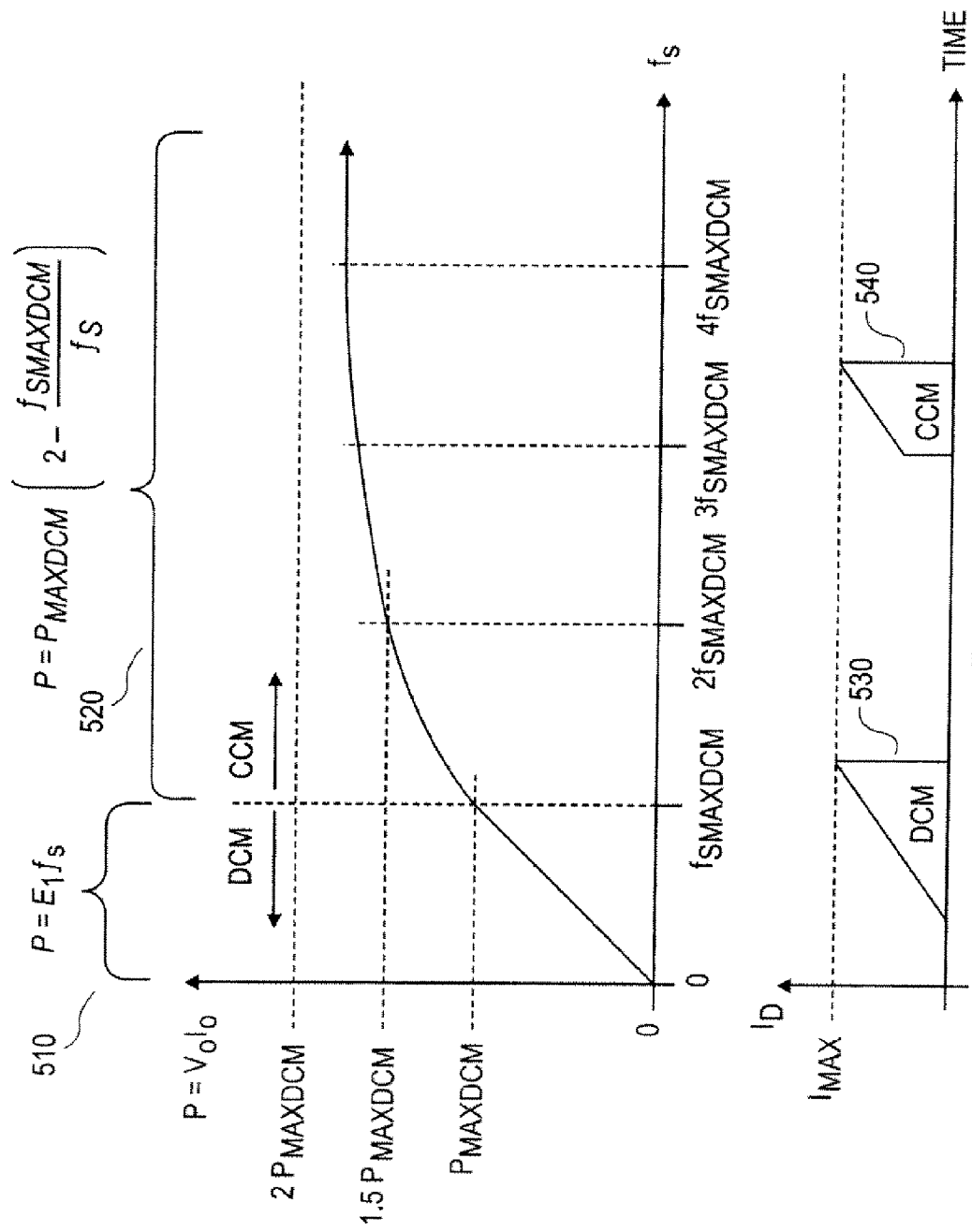
FIG. 5 is a graph of the maximum theoretical output power for a switching power supply as a function of switching frequency that illustrates how a temporary increase in output power may be realized with a temporary increase in switching frequency in accordance with the teachings of the present invention.

FIG. 5 graphs the relationship between the theoretical maximum output power and the switching frequency of a switching power supply that has a current limited switch. The waveforms in FIG. 5 illustrate two fundamental modes of operation, indicated by the different shapes of the current. The triangular shape 530 is characteristic of discontinuous conduction mode (DCM), whereas the trapezoidal shape 540 is characteristic of continuous conduction mode (CCM).

For a given maximum switch current $I_{MAX}$, the maximum output power for a switching power supply is described by two simple functions of the switching frequency:

$$P = \left(\frac{P_{MAXDCM}}{f_{SMAXDCM}}\right) f_S \quad 0 \le f_S \le f_{SMAXDCM} \qquad \text{Equation 1}$$

and $$P = P_{MAXDCM}\left(2 - \frac{f_{SMAXDCM}}{f_S}\right) \quad f_S \ge f_{SMAXDCM} \qquad \text{Equation 2}$$

where $f_s$ is the switching frequency, $P_{MAXDCM}$ is the maximum power in discontinuous conduction mode, and $f_{SMAXDCM}$ is the maximum switching frequency in discontinuous conduction mode that allows the current in the switch to reach $I_{MAX}$. The values of $P_{MAXDCM}$ and $f_{SMAXDCM}$ are determined by the values of the components in the circuit, as will be understood by one skilled in the art. As such, they are constants in the expressions.

FIG. 5 shows the linear relationship described by Equation 1 in the region 510 between zero frequency and $f_{SMAXDCM}$, the maximum frequency in discontinuous conduction mode. In the linear region 510, the output power is directly proportional to the switching frequency $f_s$. The maximum power in discontinuous conduction mode is $P_{MAXDCM}$ at switching frequency $f_{SMAXDCM}$.

In the region 520, at frequencies greater than $f_{SMAXDCM}$, the power supply operates in continuous conduction mode. In continuous conduction mode, the power curve is part of a hyperbola as described by Equation 2, approaching a maximum of twice $P_{MAXDCM}$. FIG. 5 shows that higher switching frequency gives higher output power.

Figure 6:
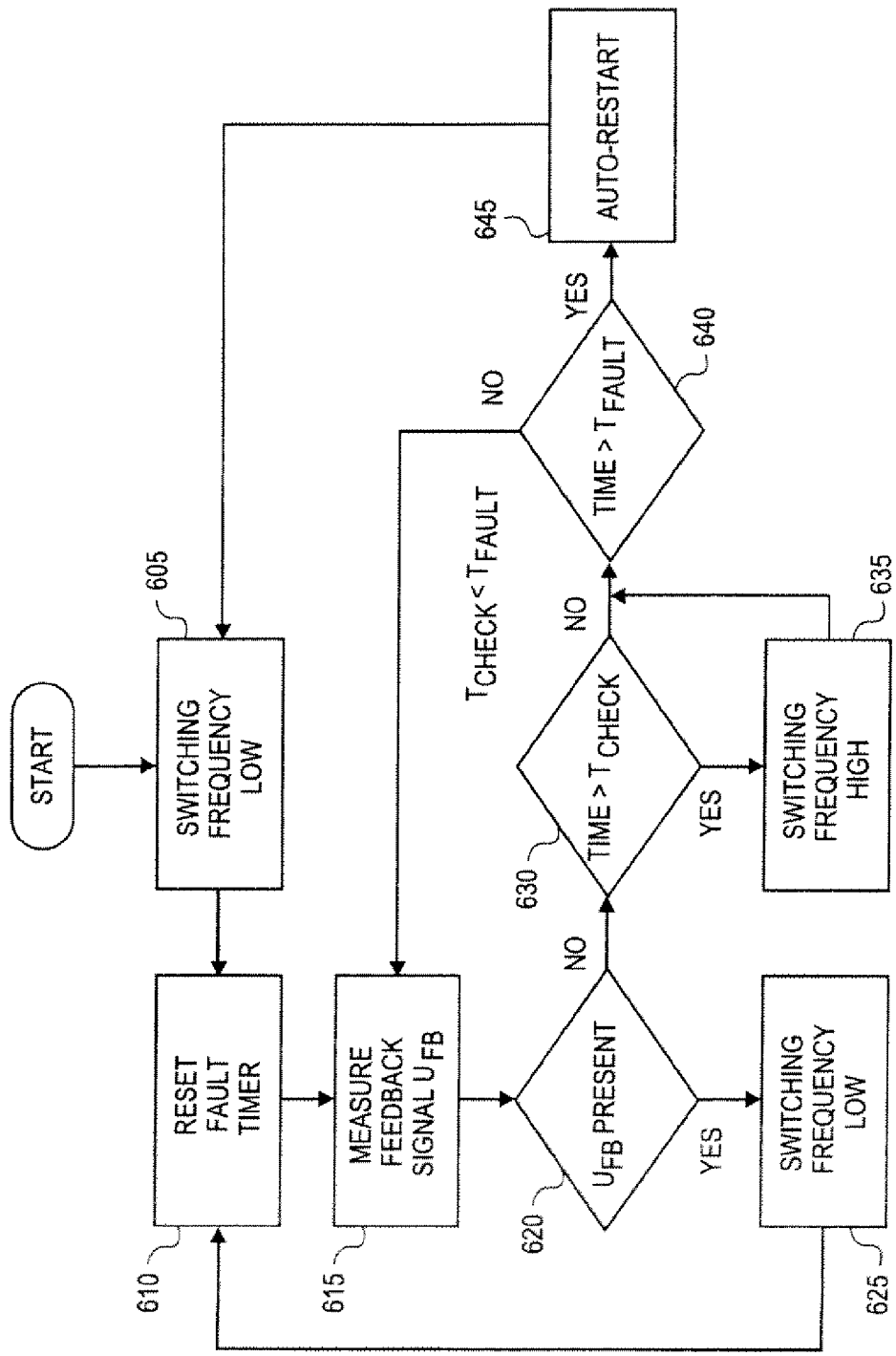
FIG. 6 is a flowchart of one embodiment of a method to provide fault protection in unregulated operation for an embodiment of a switching power supply in accordance with the teachings of the present invention.

FIG. 6 is a flowchart illustration that describes one embodiment of a method to provide fault detection for a switching power supply that operates with an unregulated output in accordance with the teachings of the present invention. As shown, switching frequency is set at the lower of two values in block 605, and a fault timer is reset in block 610. A feedback signal $U_{FB}$ is measured on block 615.

If the feedback signal $U_{FB}$ is present as indicated by block 620, the switching frequency remains low and the fault timer is reset as indicated by blocks 625 and 610 respectively. If the feedback signal $U_{FB}$ is not present, the time since the reset of the fault timer is compared to a time $T_{CHECK}$ that is less than a fault time $T_{FAULT}$ as indicated by block 630.

During the time between $T_{CHECK}$ and $T_{FAULT}$, the power supply checks the operation of the feedback circuit with a feedback check operation. The feedback check operation increases the switching frequency to the higher of two values, thereby increasing the output power to raise the output voltage or the output current to a regulated value as indicated by blocks 635, 640, 615, and 620. The presence of a feedback signal that is in response to the increase in output power will reduce the switching frequency to the lower value and will reset the fault timer. If no feedback signal is present after the fault time $T_{FAULT}$, the power supply enters the auto-restart cycle as indicated by blocks 640 and 645. The auto-restart cycle continues until a feedback signal is present.

Figure 7A:
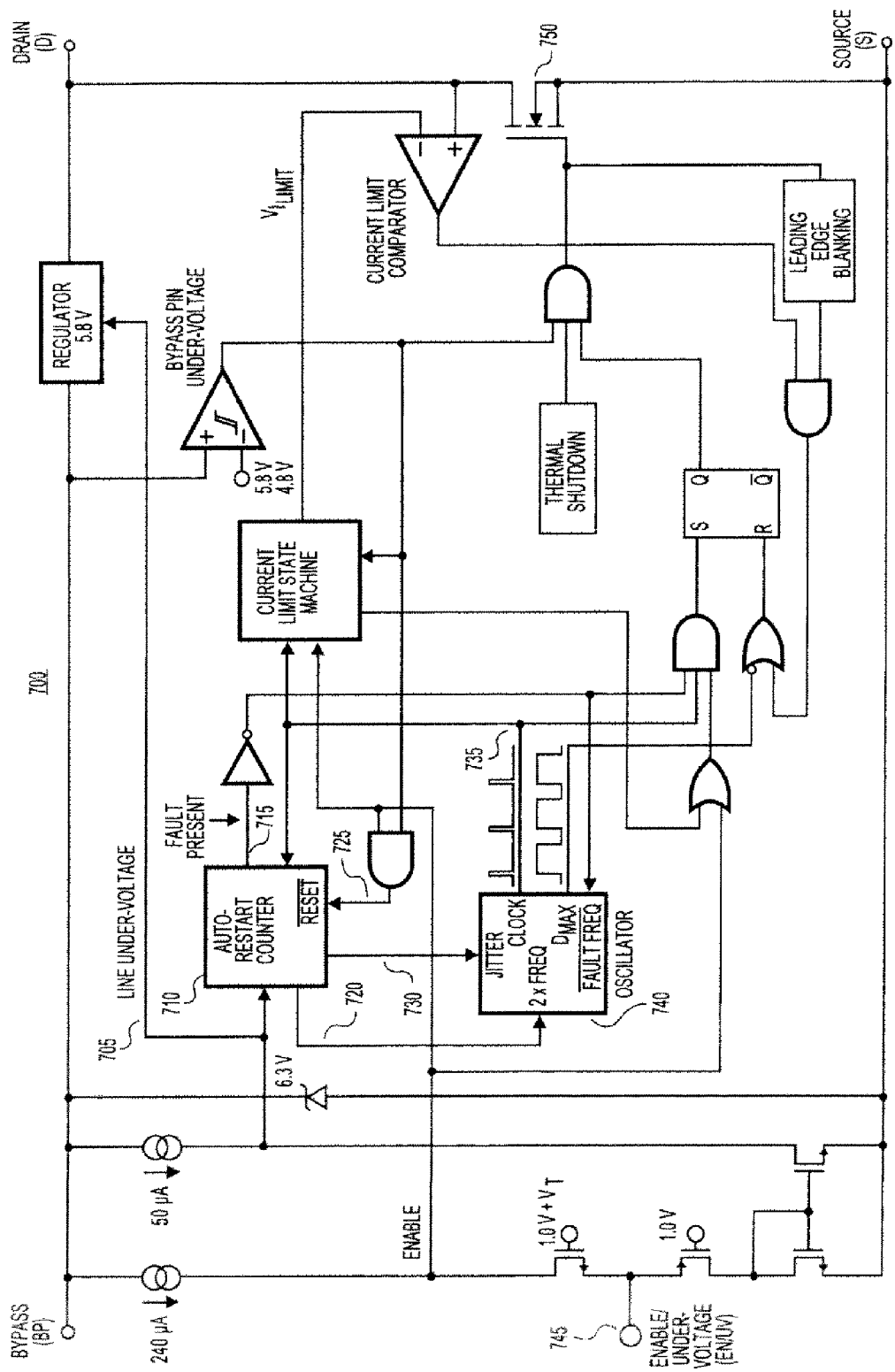
FIG. 7A shows functional elements of one embodiment of a controller for a switching power supply in accordance with the teachings of the present invention.

FIG. 7A illustrates one embodiment of an integrated circuit in accordance with the teachings of the present invention. In one embodiment, functional elements of one embodiment of a controller for a switching power supply are shown. For instance, FIG. 7A shows a functional block diagram of an integrated circuit 700 that includes a power transistor switch 750, an oscillator 740 and an auto-restart counter 710. In an embodiment in which the integrated circuit 700 is operational in a power supply, an enable/under-voltage terminal 745 receives a feedback signal that indicates whether or not power transistor 750 should switch. The absence of a feedback signal could indicate either a fault in the feedback circuit or a desired mode of unregulated operation. The integrated circuit uses an auto-restart counter 710 with an oscillator 740 to select the desired action for the switch 750.

Oscillator 740 produces a clock signal 735 at different switching frequencies according to signals from the auto-restart counter 710. The clock signal 735 has a nominal switching frequency that has an average value, for example 132 kHz. The nominal switching frequency is modulated about the average value by a frequency modulation, for example ±4 kHz, in response to a jitter signal 730 that is received from the auto-restart counter 710. The frequency modulation is typically much less than the average of the nominal switching frequency. The jitter signal 730 modulates the nominal switching frequency at a jitter modulation rate, for example 1 kHz. The jitter modulation rate is typically much less than the jitter modulation. A feedback check frequency is twice the nominal value, selected in response to a loop check signal 720 from the auto-restart counter 710. A fault frequency is selected in response to a fault present signal 715 from the auto-restart counter 710. The fault frequency is typically 5% of the nominal switching frequency.

Figure 7B:
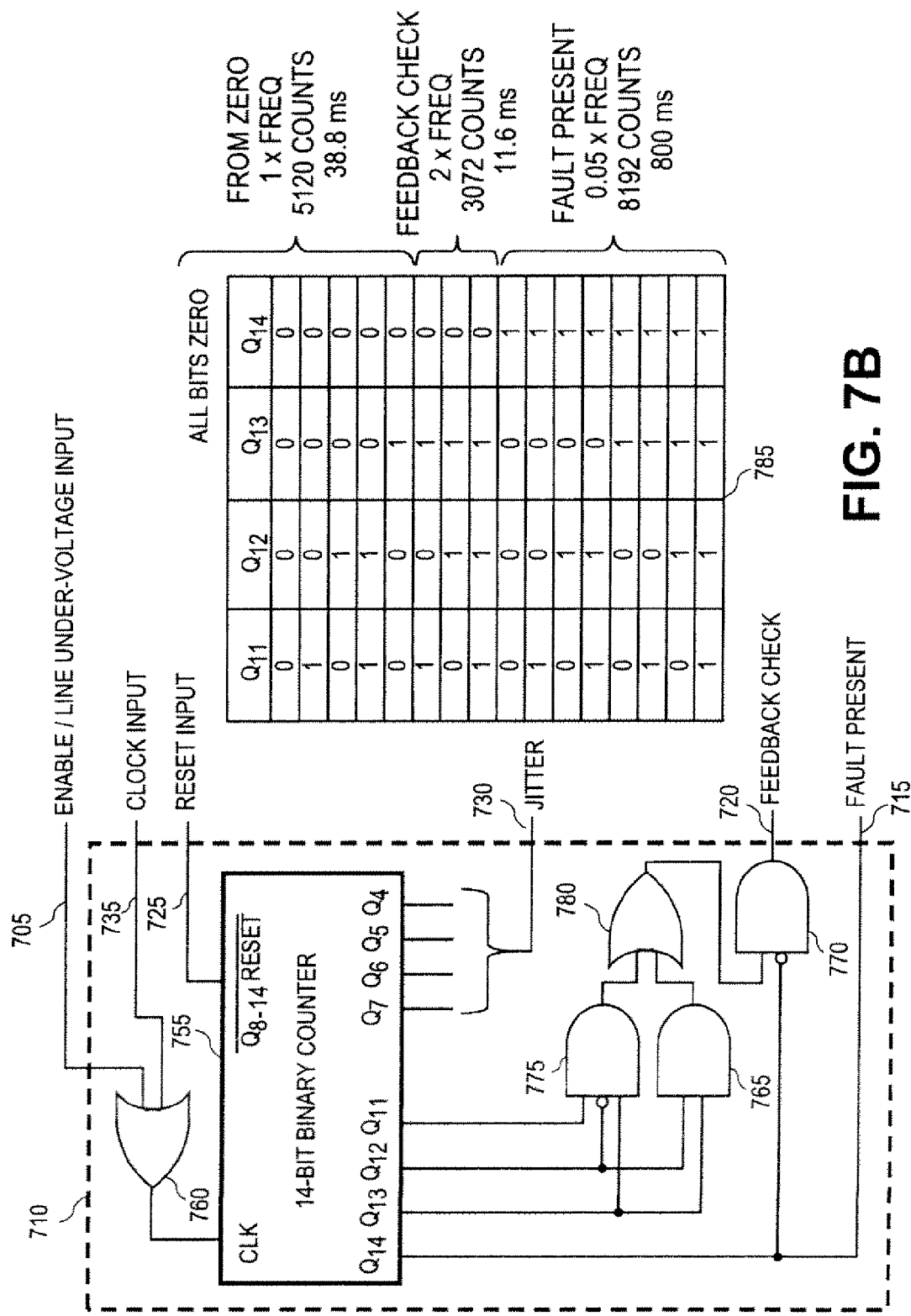
FIG. 7B shows a detail of one embodiment of an auto-restart counter included in an embodiment of a controller for a switching power supply in accordance with the teachings of the present invention.

FIG. 7A shows auto-restart counter 710 receives an enable/line under-voltage signal 705, a clock signal 735, and a reset signal 725. Auto-restart counter 710 produces a jitter signal 730, a feedback check signal 720, and a fault present signal 715. FIG. 7B shows a detail of one embodiment of an auto-restart counter 710 in accordance with the teachings of the present invention. As shown, auto-restart counter 710 includes a 14-bit binary counter 755 with logic gates 760, 775, 780, 765, and 770.

Auto-restart counter 710 provides the timing for changes in the switching frequency, for checking the operation of the feedback circuit, and for auto-restart operation when a fault is detected. The 14 output bits from binary counter 755 are designated $Q_1$ through $Q_{14}$, with $Q_1$ the lowest bit and $Q_{14}$ the highest bit. The four bits $Q_4$, $Q_5$, $Q_6$, and $Q_7$ constitute jitter signal 730. The four highest bits $Q_{11}$, $Q_{12}$, $Q_{13}$, and $Q_{14}$ constitute the fault timer. Bits $Q_{11}$ through $Q_{14}$ are decoded by logic gates 775, 765, 780, and 720 to generate the feedback check signal 720 and the fault present signal 715. The reset input 725 resets to zero only bits $Q_8$ through $Q_{14}$ of the counter. Bits $Q_1$ through $Q_7$ are not reset to allow counter 755 to maintain the timing for the jitter output 730.

Table 785 shows that when the average of the nominal switching frequency is 132 kHz, the feedback check signal 720 is asserted approximately 38.8 milliseconds after the fault timer is reset unless the fault timer is reset by the presence of a feedback signal at terminal 745 in less time. The feedback check signal 720 then doubles the frequency of the oscillator for the feedback check time of approximately 11.6 milliseconds, unless the fault timer is reset by the presence of a feedback signal at terminal 745 in less time. If the fault timer is not reset by the presence of a feedback signal within the feedback check time, the auto-start counter 710 asserts the fault present signal 715. The fault present signal 715 reduces the frequency of the oscillator to a fault frequency of approximately 5% of its nominal value. The presence of a feedback signal at terminal 745 resets the fault timer and resets the oscillator to the nominal switching frequency.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A controller for a power supply, the controller comprising:
   an auto-restart counter coupled to measure a duration of an absence of an adequate feedback signal of the power supply, wherein the auto-restart counter is coupled to output a fault present signal when the feedback signal is absent longer than a fault time to substantially reduce an average power at an output of the power supply, wherein the auto-restart counter is further coupled to output a feedback check signal before expiration of the fault time to substantially raise the average power at the output of the power supply; and
   an oscillator coupled to the auto-restart counter and coupled to output a clock signal, wherein the clock signal raises from a first non-zero switching frequency to a second non-zero switching frequency greater than the first non-zero switching frequency in response to the feedback check signal.

2. The controller of claim 1, further comprising a power switch coupled to switch in response to the clock signal of the oscillator to selectively regulate an output voltage of the power supply over a range of output currents of the power supply and to selectively regulate an output current of the power supply over a range of output voltages of the power supply.

3. The controller of claim 1, wherein the clock signal reduces to a third non-zero switching frequency that is less than the first non-zero switching frequency in response to the fault present signal.

4. The controller of claim 3, wherein the third non-zero switching frequency is approximately 5% of the first non-zero switching frequency.

5. The controller of claim 1, wherein the substantially raised output power drives an output current or an output voltage of the power supply into a regulated region to reestablish the adequate feedback signal.

6. The controller of claim 1, wherein the auto-restart counter further comprises a binary counter coupled to a plurality of logic gates to generate the feedback check signal and the fault present signal.

7. The controller of claim 6, wherein the auto-restart counter is reset in response to the presence of the adequate feedback signal.

8. The controller of claim 7, wherein the binary counter generates a plurality of output bits representing a binary count and wherein, when the auto-restart counter is reset, at least one of the plurality of output bits is reset to zero and at least another one of the plurality of output bits is not reset to zero.

9. The controller of claim 6, wherein at least one of the plurality of logic gates includes a first input, a second input, and an output, wherein the first input of the logic gate is coupled to receive the clock signal, the second input is coupled to receive a signal indicating whether the adequate feedback signal is present, and wherein the output of the logic gate is coupled to a clock input of the binary counter.

* * * * *